US012634140B2

(12) United States Patent
Luraschi

(10) Patent No.: US 12,634,140 B2
(45) Date of Patent: May 19, 2026

(54) ENCODED ANIMATED IMAGES AND METHODS OF GENERATING, DISPLAYING, AND READING ENCODED ANIMATED IMAGES, IN PARTICULAR FOR AUTHORIZING OPERATIONS ON ONLINE SERVICES

(71) Applicant: Intesa Sanpaolo S.p.A., Turin (IT)

(72) Inventor: Adriano Luraschi, Turin (IT)

(73) Assignee: INTESA SANPAOLO S.p.A., Turin (IT)

( * ) Notice: Subject to any disclaimer, the term of this patent is extended or adjusted under 35 U.S.C. 154(b) by 48 days.

(21) Appl. No.: 18/575,457

(22) PCT Filed: Jun. 30, 2022

(86) PCT No.: PCT/IB2022/056101
§ 371 (c)(1),
(2) Date: Dec. 29, 2023

(87) PCT Pub. No.: WO2023/275813
PCT Pub. Date: Jan. 5, 2023

(65) Prior Publication Data
US 2024/0356752 A1     Oct. 24, 2024

(30) Foreign Application Priority Data

Jun. 30, 2021    (IT) ........................ 102021000017279

(51) Int. Cl.
*H04L 9/32*      (2006.01)
*G06F 21/36*     (2013.01)
*H04L 9/08*      (2006.01)

(52) U.S. Cl.
CPC ............ *H04L 9/3228* (2013.01); *G06F 21/36* (2013.01); *H04L 9/0877* (2013.01); *H04L 9/3247* (2013.01)

(58) Field of Classification Search
CPC ... H04L 9/3228; H04L 9/0877; H04L 9/3247; G06F 21/36
See application file for complete search history.

(56) References Cited

U.S. PATENT DOCUMENTS 8,024,576 B2 * 9/2011 Gargaro ................ H04L 9/3228
705/72
8,868,902 B1 * 10/2014 Brown ............. G06Q 20/40145
713/186

(Continued)

OTHER PUBLICATIONS

International Search Report and Written Opinion in corresponding International Application No. PCT/IB2022/056101 mailed on Oct. 18, 2022, 17 pages.

(Continued)

*Primary Examiner* — Shanto Abedin
(74) *Attorney, Agent, or Firm* — MH2 TECHNOLOGY LAW GROUP LLP

(57) ABSTRACT

An encoded animated image comprising a plurality of frames configured to be displayed sequentially on a graphical interface, an encoded payload including an OTP, a transaction identification code to be authorized and the details of said transaction, the payload being distributed over at least two frames of the plurality of frames according to a reversible encoding function; and a method for generating, displaying and reading the encoded animated image.

8 Claims, 5 Drawing Sheets

(56) References Cited

U.S. PATENT DOCUMENTS

| | | |
|---|---|---|
| 2007/0220597 A1 | 9/2007 | Ishida |
| 2009/0249077 A1* | 10/2009 | Gargaro ................ H04L 9/3228 |
| | | 713/183 |
| 2013/0124855 A1* | 5/2013 | Varadarajan ............ G07F 19/20 |
| | | 726/4 |
| 2014/0019366 A1* | 1/2014 | Kannambadi ...... G06Q 20/3276 |
| | | 705/72 |
| 2019/0026446 A1* | 1/2019 | Hallenborg ......... H04L 63/0838 |
| 2020/0106771 A1* | 4/2020 | Guibert ................ H04L 9/3247 |

OTHER PUBLICATIONS

Mitxela.com, "Human-readable 2D Barcode," Mar. 20, 2020, 5 pages [retrieved on Mar. 4, 2022]. Retrieved from the Internet: <URL: https://mitxela.com/projects/hr_code>.

* cited by examiner

ENCODED ANIMATED IMAGES AND METHODS OF GENERATING, DISPLAYING, AND READING ENCODED ANIMATED IMAGES, IN PARTICULAR FOR AUTHORIZING OPERATIONS ON ONLINE SERVICES

CROSS-REFERENCE TO RELATED APPLICATION(S)

This application is a national stage entry from International Application No. PCT/IB2022/056101, filed on Jun. 30, 2022, in the Receiving Office ("RO/IB") of the International Bureau of the World Intellectual Property Organization ("WIPO"), and published as International Publication No. WO 2023/275813 A1 on Jan. 5, 2023; International Application No. PCT/IB2022/056101 claims priority from Italian Patent Application No. 102021000017279, filed on Jun. 30, 2021, in the Italian Patent and Trademark Office ("IPTO"), the entire contents of all of which are incorporated herein by reference.

FIELD OF APPLICATION

The present description relates to an encoded animated image 1 and a method for generating, displaying and reading an encoded animated image 1, especially for authorizing transactions of a financial nature on online services.

DESCRIPTION OF THE PRIOR ART

In the prior art, the execution of device transactions on the digital channels of a bank, for example the web application of the bank via the Internet, is typically authorized by the applicant through a mechanism that provides for a multi-factor authentication.

The first authentication factor is user-defined credentials, such as username, PIN or password on banking systems.

Over the years, in an attempt to combine a high standard of user-friendly security, and taking into account the operating costs of the chosen solution, there has been a significant evolution in the way in which the second authentication factor is communicated and used.

Some examples of solutions used are listed below:

1) Generation and pre-sharing with the user of a set of device codes to be used on-demand and for a single transaction;
2) Delivery to the user of a physical token for the timed generation of a One-Time Password/PIN, i.e. verifiable OTPs in the back-end;
3) Sending OTPs via SMS to the user's mobile phone;
4) Sending Push Notifications that can be received on the Mobile App of the bank installed on the user's device.

To ensure high security standards in authorizing device transactions, it is essential to use an authentication mechanism with at least two factors, ranging from two of the following features:

"Something you know", proven by the knowledge of credentials, such as username, password or PIN;

"Something you have", proven by the possibility of demonstrating the availability of a physical object such as smart cards, physical tokens and smartphones;

"Something you are", proven by some type of biometric recognition such as a fingerprint, iris recognition and facial recognition.

In the case of banking transactions, the "something you know" option is used in the first authentication process by logging in with username and password to access the bank's web application and open the session in which the transaction is defined and requested. The "something you have" option is used for a further stage of approval of the transaction, demonstrating that the user has received an OTP, or has cryptographic material on a physical device, for example on a smartphone. The "something you are" option can be used to unlock access to the cryptographic material of a device by reading the fingerprint on the smartphone.

Document US 2009/249077 A1 discloses a method and a system for authenticating a user with a One-Time Password (OTP) using an image reader. The OTP is encrypted in a sequence of frames to be displayed by an image reader so that the OTP code can be decrypted. The OTP is encrypted, so only a specific device can decrypt it. This ability of the specific device to decrypt the OTP provides proof of authentication of the device.

Problems of the Prior Art

In the prior art, several fraudulent activities were found to rely on astute combinations of phishing and social engineering to prey on the good faith of unsuspecting users and circumvent security controls protecting banking transactions.

A user who is not particularly attentive and aware of cyber threats can be induced, through phishing emails and websites that simulate the portal of a bank, to reveal their access credentials to cyber criminals.

Through the deception and malicious use of social engineering, a user can be prompted, for example by an attacker who pretends to be a proactive bank operator, to communicate a device code or OTP in real time, or to confirm the Push Notification received on their smartphone.

As mentioned before, the "something you are" can be used to unlock access to the cryptographic material of a device by reading the fingerprint on the smartphone. However, it should be noted here that this mechanism is used locally on the user's device and, as mentioned earlier, it poses critical issues when, for instance, the user is persuaded to unlock the transaction with his or her fingerprint in real time under the instruction of a fraudster posing as a bank employee.

In the system and method described in US 2009/249077 A1, it is necessary to read all frames, from the start sequence to the stop sequence, to obtain the encrypted OTP. The fact that one has to read all the frames in order to decode the OTP makes the actual mechanism unworkable, and not at all suitable for the banking context, where the conditions for displaying and reading the code are the most varied. In fact, the method and system disclosed in the aforementioned document are unreliable, especially if used in banking contexts, where speed of processing and high security standards are required.

SUMMARY OF THE DESCRIPTION

The object of the present description is to obtain a secure identification system that is able to overcome the drawbacks of the known systems outlined above.

A further object of the present description is to avoid swindles of the kind just described, and to protect high-risk device transactions with a mechanism that does not involve the use of security parameters communicable verbally, in writing or by sending photos or screenshots to third parties, and that ensures that the approval is unequivocally associated with a transaction that has been requested in the presence of the user on the terminal used to set up the session.

A further object of the present description is to make it safer to carry out, through the digital channels of a bank, banking transactions of high value and risk, countering possible fraudulent activities, such as those perpetrated through phishing, smishing and vishing.

Another object of the present description is to be able to use the "something you are" option to unlock access by back-end server authentication.

The technical task mentioned and the specified objects are substantially achieved by an encoded animated image 1 and a method for generating, displaying and reading an encoded animated image 1, in accordance with one or more of the appended claims.

Advantages of the Description

By means of one embodiment, it is possible to obtain an encoded animated image 1 to be used as an alternative to the known encoding techniques described above.

Through another embodiment, it is possible to create a method for generating, displaying and reading said encoded animated image 1, which can be used especially for the authorization of transactions on online platforms.

As a result of the present description, the "something you are" option can be used to unlock access by back-end server authentication.

BRIEF DESCRIPTION OF THE DRAWINGS

The features and advantages of the present description will become apparent from the following detailed description of a possible practical embodiment, illustrated by way of non-limiting example in the set of drawings, wherein.

DETAILED DESCRIPTION

Even if not explicitly highlighted, the individual features disclosed with reference to the specific embodiments shall be understood as accessory to and/or interchangeable with other features disclosed with reference to other embodiments.

The present description refers to an encoded animated image 1 that can be displayed on a graphical user interface. In the present disclosure, the animated image 1 shall also be referred to as a dynamic logo.

The encoded animated image 1 includes a plurality of frames F configured to be displayed sequentially on a graphical interface. In the context of the present description, animated image 1, or dynamic logo, means a dynamic image, i.e. one in motion when comprising a series of frames F displayed in succession and then in sequence.

The encoded animated image 1 comprises an encoded payload comprising an OTP code, an identification code of a transaction to be authorized, and the details of the same transaction. The encoded payload is distributed over at least two frames F of the plurality of frames F according to a reversible encoding function. In the context of cryptography and computer security, OTP code or One-time password refers to a password that remains valid only for a single access session or financial transaction. Preferably, an OTP code comprises a password or PIN valid for a limited time, more preferably for less than a minute, and usable just one single time and only for a single access session or transaction. Using an OTP code instead of a static password makes it possible to counter so-called replay-attacks. This means that, even if a potential attacker managed to intercept an OTP code that had already been used to access a service or perform a transaction, he or she would still not be able to reuse it, as the same OTP code would no longer be valid.

For the sake of brevity, within the scope of the present disclosure reference will be made to a plurality of frames F that can be displayed sequentially on a graphical interface to construct the animated image 1 of the present description. However, this definition should not be interpreted in the most limiting sense, i.e. as a sequence of frames F consisting of analogue images. In fact, within the scope of the present description, i.e. on electronic devices such as smartphones, tablets and computers, the sequence of frames F of the animated image 1 is preferably obtained through a programme which determines its configuration and display in digital format.

Figure 1:
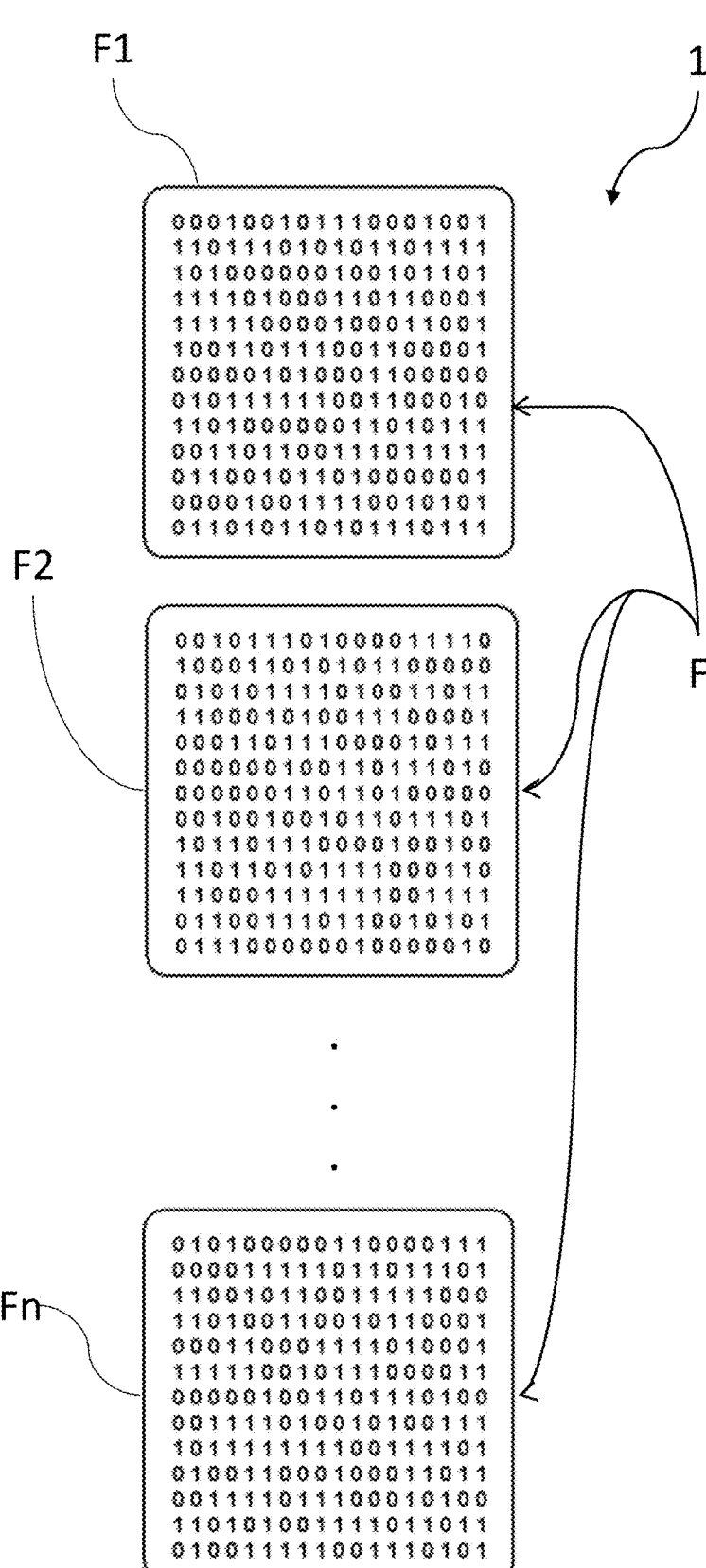
FIG. 1 shows the encoded animated image in accordance with an embodiment of the present description.

In accordance with a preferred solution of the description illustrated in FIG. 1, each frame F of the plurality of frames F of the encoded animated image 1 comprises a plurality of alphanumeric strings. The encoded payload is divided into at least two parts distributed over at least one string of each of the two frames F of the plurality of frames F, according to the encoding function. In other words, the payload is encoded such that to decode it is necessary to process at least n (with n≥2) frames F, of the plurality of N (with N≥n) frames F. Preferably, the encoded payload is divided into at least two parts distributed over at least one string of each of the two frames F of the plurality of frames F, according to the encoding function. Put differently, each frame F includes a number of strings, that is, rows formed by a sequence of alphanumeric characters. Some or all characters are changed between a frame and the next one. In this context, the encoded payload is thus divided into at least two portions, which are in turn distributed over one or more strings of two or more frames F. Such division and distribution of the encoded payload is performed by means of the encoding function. This encoding function is reversible, and therefore by applying an inverse function when reading the encoded animated image 1 it is possible to reconstruct the original payload. More preferably, the payload is encoded on all frames of the plurality of frames F in such a way that it is sufficient to process any two frames F of the plurality of frames F in order to decode it.

Advantageously, the animated image in which each frame is made up of sequences of characters allows the payload to be reconstructed by reading at least two frames and applying a decoding function. Conversely, in the known art, in order to obtain the encrypted OTP it is necessary to read all the frames, from the start sequence to the stop sequence. In the description in question, as a result of a particular encoding algorithm, it is sufficient to read a subset of frames to be able to decode the payload. For example, it is sufficient to read any two frames out of a total of 10 frames in order to decode the payload. This latter feature of the description enables the management of different image capture frequencies peculiar to different models of client devices used, such as smartphones.

According to an alternative embodiment to the previous one, the animated image 1 represents a dynamic figure, defined by contours and optionally in colour. According to this preferred embodiment, the encoded payload is embedded in the graphic elements of the figure represented in the frames F in ways similar to those disclosed above. For example, graphic elements of the animated image 1, such as the outlines of the figure and/or the colours of the image represented in at least two frames F, hide the payload according to the reversible encoding function.

The present description also relates to a method for generating, displaying and reading an encoded animated image 1 by an online service. An online service means a web application back-ended by at least one web server where registered and authenticated users can request transactions. In addition, the web server is associated with at least one database in which registered user data is stored. For the sake of brevity, in the present disclosure particular reference will be made to the preferred embodiment in which the online service is the online banking service offered by a bank.

The method comprises the step of providing a random function for generating OTP codes, a reversible encoding function, and a recognition function resident and executable on a web server associated with the online service. It should be pointed out here that encryption is a specific case of coding: the substantial difference in the case of encryption is the presence of a key for transformation, while for coding there are only rules. Thus, optionally, the OTP code can also be encrypted. Preferably, the web server is part of a central system of a bank and, more preferably, is associated with a database comprising the data of the bank's users.

The method further comprises the step of providing a reading and decoding function and an identification function that are resident and executable on a client device associated with an authenticated user. It should be noted here that the client device is equipped with at least one camera and is placed in communication with the web server to enable an exchange of data, preferably by means of a mobile web connection. It is also worth noting that, compared to the methods of the prior art, the method of the description does not require a specialized hardware device to read the payload.

The method involves generating an OTP code using the random function residing in the web server of the online service. In other words, the OTP code is generated on the web server side, that is, at the back-end. The OTP code is at least associated with an authenticated browsing session of the client device on the web server, with the identification code of the transaction and with the details of the transaction itself to form the payload. Preferably, the random function comprises the Lamport algorithm for generating OTP code. Advantageously, it is substantially impossible for an attacker to guess the next OTP code from the analysis of a previous sequence of OTP codes generated by the same algorithm. As mentioned above, the method requires the OTP code to be generated, by the back-end server, with each transaction to be authorized requested by a certain user on the online service. In particular, on the server side, which, for example, is the central system of a bank, a component is invoked, i.e. the random function, to generate an OTP code that is associated on a specific database table with a series of information, including specific characteristics of the transaction requested by the user, such as a transaction identification code and a string with the details of the transaction itself, and preferably the expiration of the OTP code, the identification of the requesting user, and the identification of the user session.

The method comprises the step of generating an encoded animated image 1, comprising a plurality of frames F configured to be displayed sequentially on a graphical interface, encapsulating the payload by dividing it into at least two parts and distributing these over at least two frames F of the plurality of frames F via the reversible encoding function. In other words, the payload is encapsulated in a series of frames, such that the decoding of the payload itself is obtainable through the inverse coding function starting from at least two frames F. This step of coding the payload to generate the animated image is performed on the back-end, i.e. On the web server side by means of the reversible coding function. As specified above, in the preferred embodiment of the description, also disclosed by way of example for the sake of brevity, the web server is the central server of a bank. The reversible coding function, performed on a web server of the central system of the bank, uses a custom library to generate a certain number of frames F, starting from an information content or payload, which specifically includes the OTP code generated in the previous step together with the identification of the transaction and its details. The at least two frames F are linked together and with the payload according to the specific reversible encoding function, so that their combination makes it possible to recover the payload, as will be seen later, through an inverse decoding function (called reading and decoding function). In other words, the N (with $N>=2$) frames F are linked together and with the payload according to the specific reversible encoding function, so that the combination of at least n (with $n<=N$) of them enables recovery of the payload, as will be seen later, through an inverse decoding function, called reading and decoding function. In the preferred embodiment, $N=10$, $n=2$. The payload is then encoded in a series of frames, such that its decoding is obtainable via the inverse encoding function starting from at least two frames F of the plurality of frames.

With reference to FIG. 1, translating what has just been described into a formula, $$\text{animated image } 1 =$$
$$\{\text{frame\_1}F1, \text{frame\_2}F2, \ldots, \text{frame\_n}Fn\} = f(\text{payload}),$$

where:
   payload is the information content to be transmitted through the animated image, containing the OTP code together with the identification of the transaction and its details;
   the output of the reversible encoding function is a certain number of frames (at least two), preferably PNG or JPEG format images obtained according to the payload using a bi-univocal and reversible function.

In other words, from the combination of two or more frames F it is possible to obtain an animated, dynamic image, which can be decoded, returning the original payload, and therefore the OTP code, together with the transaction identification and the details of the same transaction.

Figure 2:
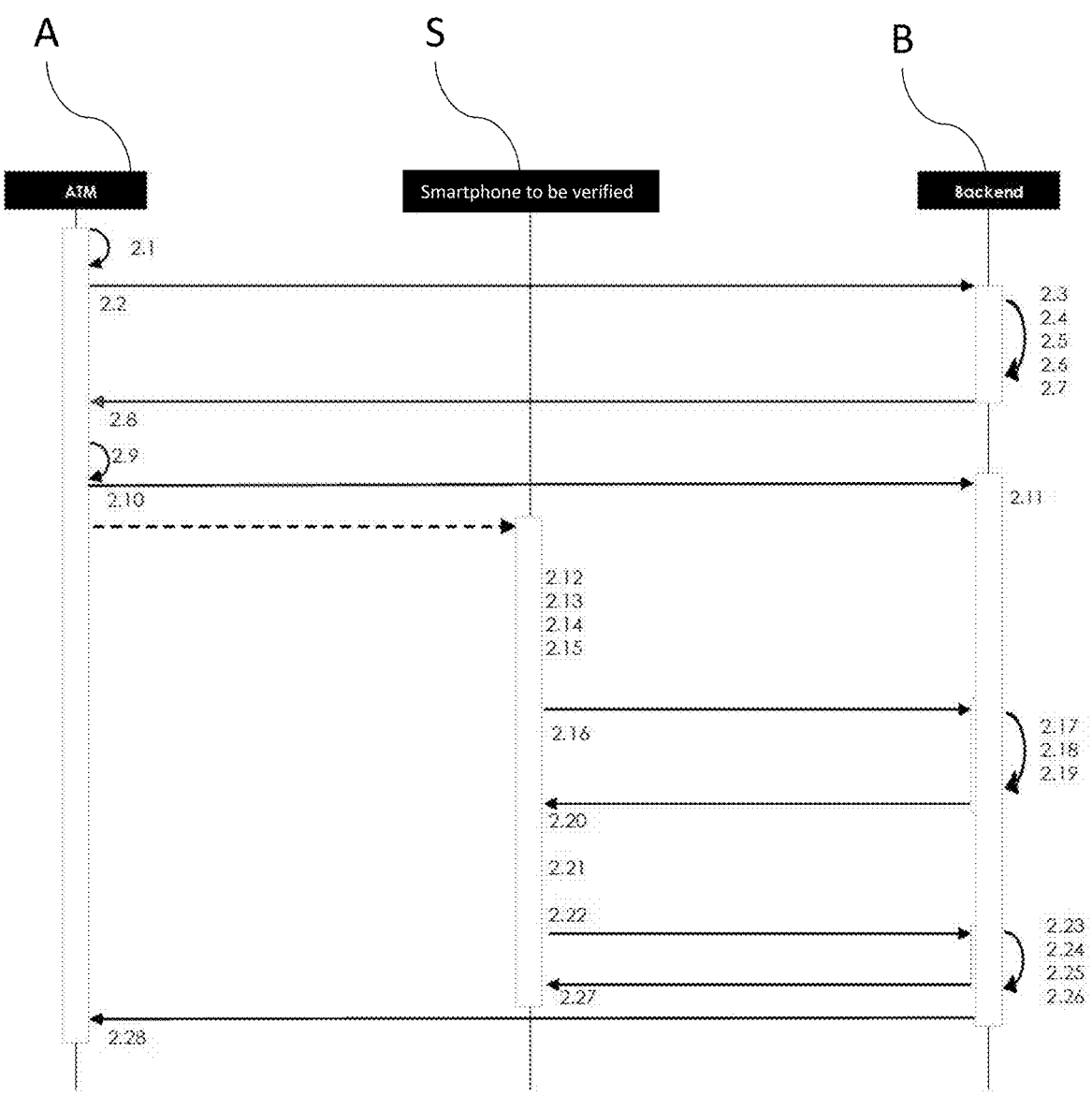
FIG. 2 shows a first example of a sequence of steps of the method according to the present description.
Figure 3:
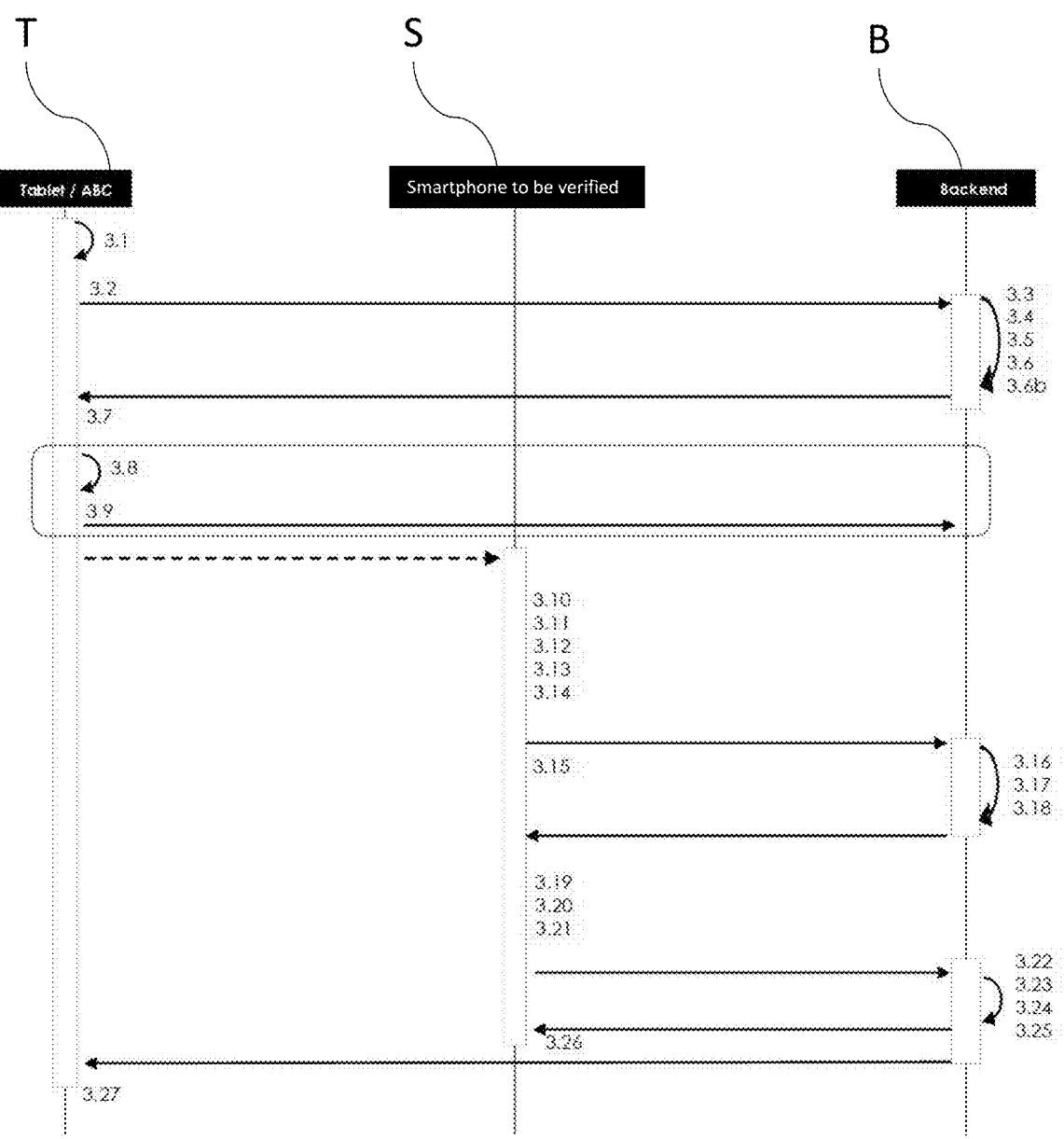
FIG. 3 shows a second example of a sequence of steps of the method according to the present description.
Figure 4:
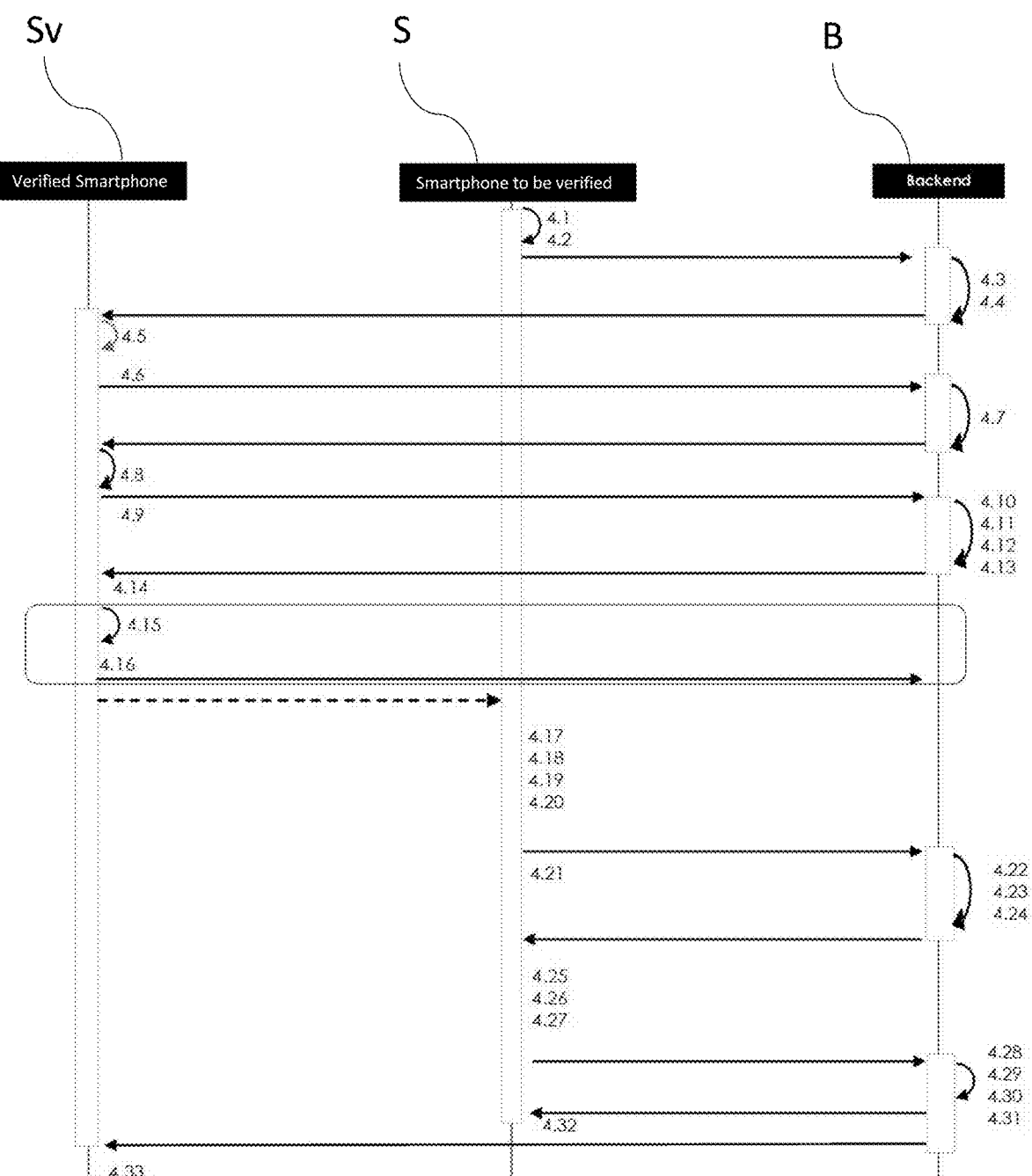
FIG. 4 shows a third example of a sequence of steps of the method according to the present description.
Figure 5:
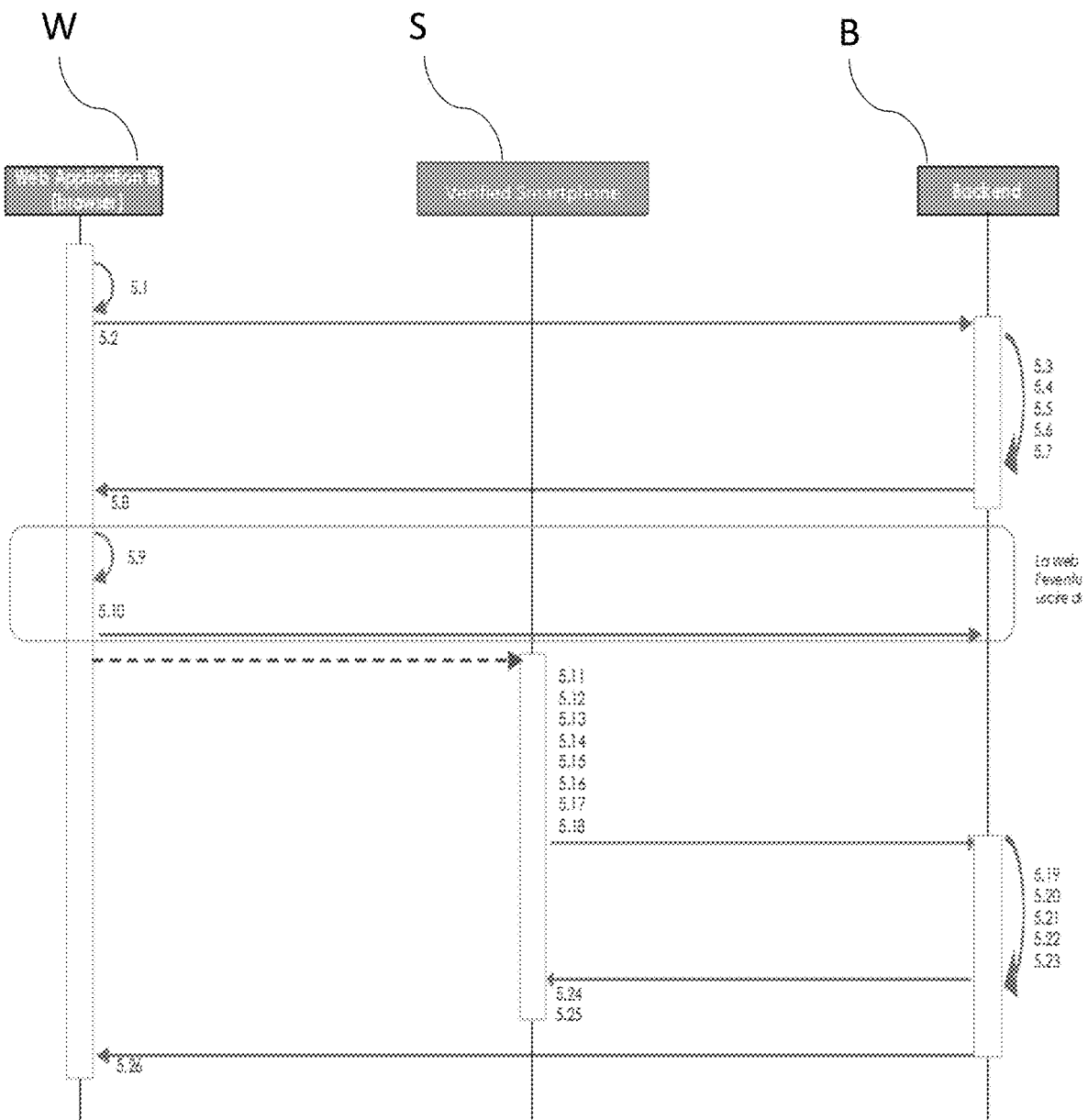
FIG. 5 shows a fourth example of a sequence of steps of the method according to the present description.

The method also comprises the step of reproducing the plurality of frames F sequentially on a graphical interface in communication with the web server, so as to display the encoded animated image 1. Preferably, the method comprises the provision of a display function resident and executable on the terminal used to display the animated image. Depending on the specific use case, as will be apparent from the preferred embodiments and examples disclosed below and illustrated in FIGS. 2 to 5, the moving animated image is preferably displayed on one of the following software systems:

an ATM system, in the use case of the verification/enabling of a client device at ATM (FIG. 2, example 1);

a system used by the bank's clerks, in the use case of verification/enabling of the client device at a bank (FIG. 3, example 2);

a Mobile App, in the use case of transitive verification/enabling of a new/second client device (FIG. 4, example 3);

a web browser on a Web Application, preferably of a bank, in the use case of a high-risk device transaction (FIG. 5, example 4).

For each of the aforementioned types of systems for displaying the animated image, a software library is created that implements a display function which, on receiving the series of frames F that constitute the animated image object 1, displays the moving image corresponding to the payload encapsulated in the aforementioned frames F.

Preferably, the method comprises reading and decoding the encoded payload by the reading and decoding function when the camera of the client device captures the encoded animated image 1 displayed on the graphical interface. The reading and decoding function is the inverse function of the encoding function. More preferably, the reading and decoding function is based on an artificial intelligence algorithm for image recognition, which allows a character string to be extracted from a frame; such function is applied to multiple frames, followed by a decoding function which extracts the payload. This step is then performed on the client side, that is, on the client device in which the reading and decoding function resides. In the preferred embodiment of the description, the client device is a smartphone or tablet and includes a Mobile App in which the function of reading and decoding the animated image resides. This function is therefore performed on the Mobile App and, using a specific library, implements the following function:

payload=$f^{-1}$(animated image), where the animated image is obtained by capturing the displayed image with the camera of the smartphone, extracting a certain number of frames F, greater than one, and applying an appropriate algorithm to perform decoding and extract the payload that contains the OTP code in addition to the identification of the transaction and its details.

Preferably, the method includes the step of displaying on the client device the type of transaction being authorized, and the details thereof.

The method involves generating an identification code by processing the decoded payload using the identification function and sending it to the web server. This step is also performed on the client side, preferably through the Mobile App of the client device in which the identification function resides for the calculation of the "response" to be sent to the web server. On the client side, by means of the Mobile App and using the component disclosed in the previous step, it is possible to decode the animated image, obtaining the original payload sent by the web server, which contains the OTP code. It should be noted that, once the payload has been decoded, it is possible to show on the client device the details of the transaction that is being approved through the verification of the animated image. Clearly, this ensures that the user is aware of what he or she is approving and protects him or her from attacks that exploit social engineering. In addition, a mechanism is used on the Mobile App to demonstrate that the response has been calculated on a specific client device of the user, using precisely the identification function. It must be specified that, in the calculation of the response, not only the OTP, but also the entire payload is used. The identification function applies to the entire payload (OTP, transaction identification code, transaction endpoint string) and generates an output (i.e. the response) that also depends on a unique parameter that univocally identifies the client device (Fingerprint device).

Advantageously, with respect to the prior art, the authentication test of the device is not given by the ability to decrypt the encrypted OTP but by the response calculation function. In addition, the response is not only a function of the OTP but also of the identification code of the transaction and its details. This last point, combined with the fact that the user's client device shows the details of the transaction it is approving, protects against attacks that could alter the animated image by decoupling the OTP from the associated transaction and leading the user to believe that it is a different transaction, for example with a smaller amount.

In the following, a few preferred embodiments of the identification function will be disclosed.

The method then classifies the client device as legitimate when the identification code processed by the recognition function corresponds to that expected for the corresponding OTP cod, that is, the one originally created by the random function for the generation of OTP codes. In other words, the method involves verifying the identification code (response) sent by the client device through the recognition function, which processes the response and verifies the correctness of the OTP associated with the transaction requested.

According to a preferred embodiment, the step of generating an identification code by processing the decoded payload via the identification function and sending it to the web server comprises the sub-step of sending the identification code (response) to the web server using an encoded protocol. Advantageously, such procedure further increases security, providing greater protection from possible cyber attacks.

Preferably, the step of generating an identification code by processing the coded payload through the identification function and sending it to the web server includes the sub-step of digitally signing the coded payload through the identification function to generate the identification code. Advantageously, such procedure further increases security, providing greater protection from possible cyber attacks.

According to a preferred alternative solution to the previous one, the step of generating an identification code by processing the decoded payload by means of the identification function and sending it to the web server, includes the sub-step of generating a second OTP code associated with the encoded payload by means of the identification function to generate the identification code. Advantageously, such procedure further increases security, providing greater protection from possible cyber attacks.

According to a preferred embodiment of the description, the method is employed to authorize a transaction on the online service requested by the authenticated user on an electronic device equipped with a graphical interface. The step of generating an OTP code through the random function includes the sub-step of associating the OTP code to the transaction requested by the authenticated user on the online service. Furthermore, the step of reproducing the plurality of frames F sequentially on a graphical interface in communication with the web server, so as to display the encoded animated image 1, comprises the sub-step of displaying the encoded animated image 1 on the graphical interface of the electronic device. In addition, the method includes the further step of authorizing the transaction requested by the authenticated user on the online service when the client device is classified as legitimate. Preferably, the user is shown the summary containing the details of the transaction on the client device, and is explicitly asked to approve the transaction by entering the PIN, or by way of the user's fingerprint on the smartphone or by facial recognition. For example, the following steps are provided: i) on a graphic interface in communication with the web server the animated image is shown, and then the sequence of the frames; ii) the user's device (smartphone) frames the animated image and decodes it, obtaining the payload; iii) the user's device shows the summary of the transaction (contained in the decoded payload) and an explicit authorization is requested by inserting the PIN, or with the user's fingerprint on the smartphone, or with facial recognition. Advantageously, the method is employed to authenticate a user to authorize a transaction requested by him/her in order to increase the level of security. In fact, the method of the present description can be applied to establish the identity of the user requesting and authorizing the transaction with a high degree of security compared to the known methods of authentication and authorization of transactions This method is particularly effective and beneficial for the authorization of financial transactions, such as through the online service offered by a bank. This application makes it possible to prevent and combat fraud, for example not only cyber attacks, but also fraudulent e-mails in the case of phishing, fraudulent SMSs in the case of smishing and telephone scams in the case of vishing.

Preferably, after downloading and installing the appropriate App provided on the online service when a smartphone or tablet is used, the method initially comprises a step in which the user registers and, more preferably, authenticates to the online service. Such operation is defined enrolment. In each subsequent session via smartphone, the user will be able to open the App to authenticate and request a transaction, repeating the other steps of the method that lead to the authorization of the requested transaction.

As already pointed out several times, in the preferred embodiment of the description the client device is a smartphone. The transaction requested by the user requires that the client device be enabled to perform subsequent financial transactions. Also preferably, the step of authorizing the transaction requested by the authenticated user on the online service when the client device is classified as legitimate comprises the sub-step of enabling the client device to perform subsequent, preferably financial, transactions. Advantageously, the client device is enabled, by means of the procedure just disclosed, also called enforcement, to authorize subsequent financial transactions requested by the user, again by means of the method of the present description starting from the steps that involve generating and reading the animated image 1 containing an encoded payload.

Preferably, the step of enabling the client device to perform subsequent transactions involves providing the client device with the identification function to sign the OTP code digitally together with the identification code of the transaction and its details, so as to generate the identification code for the authorization of subsequent transactions requested by the user. Advantageously, such procedure further increases the security of the procedure, additionally protecting it from possible cyber attacks. Preferably, at the end of the enrolment and subsequent verification/enabling step a private key saved on the client device in a protected manner is used to sign digitally the OTP code to be sent back to the web server, together with the transaction identification code and its details. The identification function may be formulated as follows:

$$SignedOTP=sign(PrivKeyDevice, Payload)$$

Also preferably, access to the private key is further protected by a system already present in the client device, such as PIN, fingerprint and facial recognition.

As an alternative to the digital signature, in accordance with the above, a second OTP code timed locally to the client device can be generated. This second OTP code is based on a specific seed, stored securely on the client device, which is verifiable by the back-end server. This seed is provided to the client device at the end of the enabling phase of the same. This identification function may be formulated as follows:

$$SignedOTP=sign(generate\ LocalOTP(privateSeed), Payload)$$

Also preferably, access to the seed for the generation of the second local OTP is further protected by a system already present in the client device, such as PIN, fingerprint and facial recognition.

Also preferably, for greater security the signed OTP can subsequently be encrypted with the public key of the bank and sent back to the web server of the central system for verification and approval of the transaction. This next function may be formulated as follows:

$$Response=encr(PubKeyBank, SignedOTP)$$

It should be noted that, according to a preferred embodiment, it is possible to extend the signed information content to be sent in the response to add further criteria for the evaluation of authorization, such as adding the geolocation of the client device.

In addition, it should be noted that a secure channel communication protocol may be used as an alternative to the further encoding operations just described.

With regard to verifying the server-side OTP code using the recognition function, the response from the mobile client device must first be decrypted on the server side as follows:

$$SignedOTP=decr(PrivKeyBank, Response)$$

Subsequently, the correct origin of the response is verified, for example the signature applied on the decoded OTP, meaning the validity of the digital signature or the validity of the second OTP generated locally to the client device. Finally, the OTP code extracted from the decoding of the animated image is verified to be correct, associated with the correct transaction, and valid, i.e. not expired. When all these checks are successful, the transaction can be considered approved and the corresponding session is unlocked.

As a reference to the above, the user's enrolment involves the installation of the Mobile App on the client device and its association with the identification of the user who performs the authentication. However, this procedure is not considered sufficient to enable the client device to be used for high-risk transactions, especially in the case of banking transactions. On the other hand, the enforcement step is a verification step, the purpose of which is to prove conclusively the user's possession of the aforementioned client device. From an operational point of view, at the end of the enforcement step, cryptographic material is installed and activated in a secured area of the client device. Installation in a protected area means the use of technological solutions known in the state of the art to ensure that the cryptographic material loaded on the client device is not exportable, not copyable and not modifiable by an attacker, even if the latter had physical or telematic access to the client device. According to a preferred embodiment disclosed above, it is possible to use this cryptographic material to perform digital signature operations, or it is possible to use a local generator of timed OTPs, verifiable in the back-end on the web server, to prove that a message came from a specific enrolled and verified client device. In addition, several ways to prove the user's ownership of the client device are permissible. Each of them is characterized by a recognition process that includes several authentication factors that are considered sufficiently secure. By way of example, one may consider the possession of a debit card and the knowledge of the corresponding PIN, and personal recognition in the bank using an identity document.

Advantageously, it is possible that the user verifies and then enables multiple client devices to authorize subsequent transactions requested by the user on the online service. Such client devices, for example smartphones, may be associated with the user's account by performing for each client device the enrolment and verification/enforcement phase described above, or by requesting the transitive extension to a second client device starting from a first client device already verified and enabled, repeating the method of the description using the first authorized device to authorize the enabling of the second device in the enforcement phase. It should be noted that the possibility of associating multiple devices with a user would be difficult to achieve with the solutions of the known art. In fact, the OTP conveyed by the frames of the known art is encrypted, and therefore would be decipherable only by a device that possesses the correct decryption key. Therefore, this OTP conveyed by the frames would not be decipherable by two different devices of the user, unless they share the same key. On the other hand, should the same key be assigned to two different devices of the user, in order to disable the device in the event of loss, the key of both devices would have to be invalidated. In such a scenario it would therefore be necessary to repeat the enforcement.

Still preferably, the transaction requested by the user in a subsequent browsing session on the online service comprises a financial transaction. The step of authorizing the transaction requested by the authenticated user on the online service when the client device is classified as legitimate, comprises the sub-step of authorizing the financial transaction only if the client device is enabled to execute financial transactions. Preferably, the approval process for a certain transaction therefore involves requesting the transaction in an authenticated user session, e.g. via a bank's online service accessible via web application, after authentication with username and password. Advantageously, the transaction requested in the aforementioned session is unlocked and authorized by means of an action that, through the method of the description that employs the animated image, and the cryptographic material acquired during the enrolment phase and subsequent verification, involves a verified personal client device (e.g. smartphone), associated with the user requesting the transaction. As part of the method of the description, this action is accomplished by reading the animated image 1 through the enabled client device, with consequent confirmation and authorization of the transaction requested by the user.

Preferably, the electronic device is a computer, a tablet, a smartphone or an ATM.

Advantageously, when a certain transaction is requested for which an explicit secure authorization is required by the user, an animated image is shown on the terminal used to request the transaction, also identifiable as a dynamic logo, i.e. a dynamic moving image, alternative, for example, to the by now known QR code, which hides a payload, i.e. the OTP code, together with an identification code of the transaction and the details thereof. The payload hidden in the animated image is not readable by the user, who therefore cannot verbally communicate it to third parties. In addition, by virtue of its dynamism, the animated image has the characteristic of not being able to be retransmitted through photography or as a static image, since the payload is encoded and distributed over at least two frames. The animated image can be decoded by the user's device, in the preferred embodiment, using a specific functionality of the Mobile App of the bank, which, having obtained the payload, can use the cryptographic material on board to calculate the corresponding response, also referred to as identification code, to be sent to the back-end systems of the bank's web server to confirm the authorization and unlock the corresponding session. The verification of the correspondence between payload and response can be carried out by the back-end server. Proof of authorization of the transaction requested by the user is due to the fact that only those in possession of the cryptographic material associated with a client device of the requesting user can correctly calculate the response corresponding to the payload. This is a fundamental difference with respect to the known art since, in the present description, the payload is treated only digitally, and no analogue transactions are required from a user such as the reading of an OTP code and its manual insertion via a graphical interface. This further reduces the surface area of attack by a malicious user.

Advantageously, the method employing the animated image makes it possible to demonstrate that the approval of the device transaction has been confirmed by a device in the possession of the user by means of cryptographic transactions that use security keys hosted securely on the device, or by means of systems for the local generation of timed OTPs verifiable by the back-end server. However, the most significant advantage lies in being able to reduce the security parameters that can be transmitted, as they are difficult to duplicate or hand over to a potential fraudster.

As already described, the animated image involves the use of a payload/response type mechanism to verify the "something you have". The authenticator system sends the user a payload, that is, a string containing an OTP with a certain randomness together with some information characteristic of the transaction being approved, to which the user must reply with a very precise and corresponding response, which he/she alone can calculate by virtue of his/her knowledge of a secret, i.e. the cryptographic material on his/her client device. When generating the OTP/payload, on the web server side, it is associated with the user identification, the specific device transaction and the specific session. Advantageously, it should be noted that, if several sessions are active for a certain user at the same time, it will always be possible to identify which session is associated with a certain OTP and therefore the expected response. The response calculation function is bi-univocal and involves a mechanism that demonstrates that the response itself was created by a specific device belonging to the user, such as cryptographic material hosted in a protected area of the user's verified smartphone memory. In the simplest case, the response is the payload received, then read by the dynamic image, and then returned with the digital signature calculated with a private key of the user's enabled/verified client device. Alternatively, as already mentioned, it is possible to use a more elaborate response calculation function, which adds information content, such as the geographical location of the client device. Alternatively, and again to demonstrate that the response was created by a specific device belonging to the user, it is possible to employ a local generation system, i.e. on the client device, of timed OTPs that can be verified by the back-end server. Preferably, for greater security, access to the protected cryptographic material, whether it is a private key or the seed used for the local generation of the OTP on the user's client device, must be unlocked after further explicit authentication on the smartphone, such as with a fingerprint, facial recognition or, as a secondary measure, the device's PIN. The payload that the authenticator system sends to the user is communicated by encoding it in an animated, dynamic image that conceals an information content. The OTP generated on the server side, for example a string of 6 digits, together with an identification code of the transaction and the details thereof, is encoded in a series of frames, which are alternated in order to construct a moving image. This moving image is, in fact, the animated image, also defined as a dynamic logo. Based on the frames created on the server side and associated with the transaction request, the dynamic logo is shown on the terminal, that is, on the browser that navigates the web application, on the ATM display, on the tablet used by the bank, or on the Mobile App, used to request that specific transaction. The user who created the request will have to capture the dynamic logo with his/her verified smartphone. A software integrated in the Mobile App, such as the bank's App, will use optimized filters to reduce noise caused by micro-movements of the hand holding the smartphone and potential uneven lighting conditions, and apply an algorithm to decode the payload. It should be noted that, in order for the decoding transaction to be completed successfully, the algorithm needs to process more than one frame, specifically at least two frames, which include the payload discussed so far. The payload/response mechanism is based on cryptographic transactions and, as a result of the integration with the OTP encoding together with an identification code of the transaction and the details of the same in the dynamic logo, its transmission and its decoding with a verified device constitute a significant innovation in the sector.

The following discloses some examples of implementation of the method of the present description. Specifically, examples 1 to 3, respectively illustrated in FIGS. 2 to 4, refer to the process of enforcement and verification of the user's smartphone in order for it to be enabled for the authorization of subsequent transactions requested by the user, again using the method of the description. In example 4, on the other hand, illustrated in FIG. 5, the process of authorizing a transaction using an enabled smartphone is described, for example according to one of the examples from 1 to 3.

Before a client device can be used to approve high-value and high-risk banking transactions via the animated image mechanism, it must pass the enrolment and verification steps. In the enrolment phase, the user installs the bank App and makes the association with his/her account. The verification phase, or enforcement of the device, can be carried out by the user by going in person to the ATM or to the bank, or by using another device already verified by the user in question.

Example 1

This example, shown in FIG. 2, discloses the application of the method of the description to execute the enforcement of the smartphone to the ATM. In FIG. 2, the A denotes the ATM, S the user's smartphone and B the back-end, i.e. the bank's web server. Specifically, the following describes the verification process of a client device, which has already passed the enrolment phase, carried out at an ATM of the bank circuit and using its ATM card.

The method comprises the following steps:

2.1. Start of enforcement process by the user via the ATM A.

2.2. Request for animated image to be displayed at the back-end B by sending Tax Identification Code (TIC) and ATM ID.

2.3. Identification of the user with information received from the ATM (TIC) and retrieval of the user's ID (BT (Banking Token)) and his/her email.

2.4. Generation of an OperationID by the back-end B server.

2.5. OTP generation by the back-end B server.

2.6. Generation by the back-end B serve of the animated image 1 based on OTP and OperationID.

2.7. Caching of OperationID, BT, TIC, email, ATM ID, timestamp, operation Type=ATM, counter=0, status=PENDING.

2.8. Sending the animated image 1 to be displayed and OperationID to ATM A.

2.9. Display of animated image 1 on ATM A while waiting for smartphone S to capture it.

2.10. Outcome of display and wait for response (no real exchange of data, dashed arrow).

2.11. Recovery of the non-certified DeviceID associated with the BT and sending push notification to the smartphone S.

2.12. Initiation of enforcement by the user and retrieval of the security parameters to identify the device DeviceID/device fingerprint.

2.13. Capture via smartphone S camera of animated image 1 displayed on ATM A.

2.14. Decoding of the animated image 1, obtaining the OTP and the OperationID.

2.15. Calculation of the Response by encrypting, with the security parameter, to identify the client device, the OTP extracted from the animated image, concatenated to the OperationID.

2.16. Sending the response to the back-end B server, i.e. BT, encr (OTPIOperationID, DeviceID/deviceFingerprint).

2.17. Retrieval of the DeviceID/device fingerprint starting from the BT (there may be more than one) and decryption of the response.

2.18. Verification of the OTP and checking it against what was saved in point 2.7.

2.19. Updating of animated image cache with waiting to be confirmed status.

2.20. Result of the animated image verification process (OK/KO).

2.21. The App on the smartphone S asks the user to enter the PIN for confirmation by OTP_PIN generation.

2.22. The App invokes a remote service to confirm enforcement by transmitting OTP_PIN, BT, OperationID and deviceFingerprint.

2.23. Check of OTP_PIN on the back-end B server.

2.24. Verification in the cache and final update.

2.25. Updating of the enforced status of the user's smartphone S device.

2.26. Sending of enforcement notification email to user.

2.27. Outcome of the enforcement process (OK/KO).

2.28. Outcome of the enforcement process (OK/KO/ timeout), which represents the response to the call in point 2.10.

Advantageously, the animated image depends on (i.e. encapsulates as payload) both the OTP and the OperationID. In this specific case (enforcement), the string of the transaction details is empty because this type of transaction is not characterized by, for example, an amount or other characteristic parameter.

It should be noted that, in the example, the calculation of the response depends on the device identification (deviceFingerprint), the OTP and the OperationID.

Example 2

With reference to FIG. 3, the verification process carried out in the bank is similar to that via the ATM referred to in example 1, except that the recognition can effected in person by the user, for example using an identity document instead of an ATM card, and the dynamic image is shown with the appropriate application (or App) on the tablet used by the bank instead of the ATM. In FIG. 3 T denotes the bank's tablet, with S the user's smartphone and B the back-end, that is the bank's web server.

The method comprises the following steps:

3.1. User identification and start of the enforcement process by the bank via the tablet T.

3.2. Animated image request to be displayed and sent to back-end B of BT and branch ID.

3.3. Generation of an OperationID.

3.4. Generation of OTP at the back-end B.

3.5. Generation of the animated image at the back-end B based on OTP and OperationID.

3.6. Caching of OperationID, BT, branch ID, timestamp, operationType=BRANCH, counter=0, status=PENDING.

6b. Unverified device discovery for that BT, EnterPush (OperationID).

3.7. Sending animated image to display and OperationID.

3.8. Display of the animated image while waiting for the smartphone S of the user to be certified in order to capture it.

3.9. Periodic polling to verify the outcome of the transaction (OperationID, there is no real exchange of data, dashed arrow). The ABC on the tablet T performs a periodic polling towards the back-end B for any refresh of the animated image that will take place a maximum of 3 times, increasing the value of the counter field on the cache, or to exit the display phase with OK/KO (see step 3.26).

3.10. Initiation of enforcement by the user.

3.11. Retrieval of the security parameter to identify the smartphone S device (DeviceID/deviceFingerprint).

3.12. Capture via smartphone S camera of animated image displayed on tablet T (sign pad).

3.13. Decoding of the animated image, obtaining the OTP and the OperationID.

3.14. Calculation of the Response encrypting, with the security key to identify the smartphone S, and the OTP extracted from the animated image linked to the OperationID.

3.15. Send to the back-end B the response containing BT, encr (OTPIOperationID, DeviceID/deviceFingerprint).

3.16. Retrieving the DeviceID/deviceFingerprint from the BT (there may be more than one) and decrypting the back-end B response.

3.17. Verification of the OTP and checking it against what was saved in point 3.6.

3.18. Updating of animated image cache (waiting to be confirmed status).

3.19. Result of the process of verifying the animated image (OK/KO).

3.20. The App asks the user to enter the PIN on the smartphone S for confirmation, with OTP_pin generation.

3.21. The App invokes a remote service to confirm enforcement by passing OTP_PIN, BT, OperationID and deviceFingerprint.

3.22. Verify OTP_PIN.

3.23. Verification in the cache and final update.

3.24. Smartphone S Enforced status update.

3.25. Sending of enforcement confirmation email to user.

3.26. Outcome of the enforcement process (OK/KO).

3.27. Polling of output (OK/KO/noOp/timeoutRefresh), which is the response to the polling call.

In the event of OTP code timeout, a refresh is done, including a new animated image to be displayed.

Example 3

This example, shown in FIG. 4, discloses a method of testing a new personal client device, starting from a verified personal client device, for instance, as in examples 1 and 2. The new personal client device, i.e. the smartphone S can be verified in addition to or instead of the already verified smartphone Sv. The following method therefore discloses the implementation of a second smartphone S by means of a first smartphone already certified (Sv), and includes the following steps:

4.1. User login on smartphone S to be verified.

4.2. Request for transitive enforcement to start with sending to back-end B of BT, deviceID, deviceFingerprint.

4.3. Generation of an OperationID.

4.4. Identification of the smartphone device already verified Sv for that BT, with push notification, SendPush (OperationID).

4.5. Tap on push notification or open App.

4.6. Animated image request, also called dynamic logo, getDynamicLogoSimulation (OperationID).

4.7. TechPayload generation with OTPV request.

4.8. PIN request.

4.9. getDynamicLogo (BT, deviceID, deviceFingerprint, OperationID, OTPV).

4.10. OTPV verification.

4.11. Generate OTP.

4.12. Animated image generation based on OTP and OperationID.

4.13. Caching of OperationID, BT, deviceID_oldDevice, timestamp, operation Type=ENF_DEV, counter=0, status=PENDING.

4.14. Sending the animated image to be displayed (Dynamic logo, OperationID).

4.15. Display of the animated image on the verified smartphone Sv waiting for the smartphone S to be verified to capture it.

4.16. Periodic polling to verify transaction outcome (OperationID). The App periodically polls towards back-end B for any refresh of the animated image when the OTP expires or to exit the display phase with OK/KO. Note that there is no actual data exchange, dashed line.

4.17. Retrieving the security parameters to identify the smartphone (DeviceID/deviceFingerprint)

4.18. Shooting using the smartphone S camera of the dynamic logo displayed on the already enforced smartphone Sv.

4.19. Decoding the animated image, obtaining the OTP and the OperationID 4.20. Calculation of the Response by encrypting, with the security parameters to identify the device, the OTP extracted from the logo, concatenated to the OperationID.

4.21. Send back-end B of the response containing BT, encr (OTPIOperationID, DeviceID/deviceFingerprint).

4.22. Retrieve the DeviceID/deviceFingerprint from the BT (there may be more than one) and decrypt the response.

4.23. Verification of the OTP and checking it against what was saved in point 4.13.

4.24. Animated image cache refresh (awaiting confirmation).

4.25. Result of the process of verifying the animated image (OK/KO).

4.26. The App asks the user to enter the PIN for confirmation (OTP_PIN generation).

4.27. The App invokes a remote service to confirm enforcement by passing OTP_PIN, BT, OperationID and deviceFingerprint.

4.28. Verify OTP_PIN.

4.29. Verification in the cache and final update.

4.30. Updating the Enforced status of the device.

4.31. Sending of enforcement confirmation email to user.

4.32. Outcome of the enforcement process (OK/KO).

4.33. Polling of output (OK/KO/noOp/timeoutRefresh), which is the response to the polling call. In the event of timeoutRefresh, the new logo to be displayed is also returned.

Example 4

This last example, shown in FIG. 5, describes a process for authorizing a high-risk device transaction created on a web application. The method of approval with verified smartphone Sv of a device transaction created via a web browser with the bank's web application W includes the steps listed below. It should be noted that the flow of the phases listed starts from the RBA response already received and the subsequent need to authorize the device by means of animated image/dynamic logo.

5.1. Creation of the device transaction (this point summarizes some interactions with the back-end banking systems not relevant to the description, and leads to the creation of a transactionID code that identifies the device transaction).

5.2. Request dynamic logo to be displayed with BT dispatch (representing the customer's unique identification on banking systems), transactionID, sessionID.

5.3. Generation of a dedicated OperationID for the dynamic logo, distinct from the transactionID.

5.4. Generate OTP.

5.5. Generation of dynamic logo based on OTP, OperationID and transaction summary.

5.6. Caching of OperationID, BT, transactionID, sessionID, timestamp, operation Type=DISP, counter=0, status=PENDING, OTP, expiration, summary).

5.7. Identification of the enforced smartphone S associated with that BT and sending Push Notification to that device.

5.8. Send dynamic logo to display (Dynamiclogo, OperationID).

5.9. Display of the dynamic logo while waiting for the verified smartphone to capture it.

5.10. Periodic polling to verify transaction outcome (OperationID). The Web App periodically polls back-end B for any refresh of the dynamic logo when the OTP code expires or to exit the display phase with OK/KO.

The dotted line does not represent a real flow of communication, but the user's action of capturing the dynamic logo shown on the bank's web application (in the browser on the PC monitor) with a smartphone.

5.11. Initiation of the authorization transaction by the customer.

5.12. Retrieval of the security parameters to identify the smartphone S (DeviceID/device fingerprint).

5.13. Retrieval of logo frames with smartphone S camera.

5.14. Decoding the dynamic logo, obtaining OTP, OperationID and transaction summary.

5.15. Calculation of a "challengeString" through an encoding of OTP, OperationID and Summary.

5.16. Display of the Summary on the App on the smartphone S and explicit confirmation request (with fingerprint, facial recognition or PIN insertion).

5.17 Generation of a "Response" that is a function of the deviceFingerprint, and the challengeString (note that in a possible implementation this Response is likely to be a new timed OTP, called OTPV).

5.18 Sending to the back-end B of the Response, together with the BT and the OperationID 5.19. Recovery (back-end side) of the deviceFingerprint starting from the BT.

5.20 Retrieval (back-end side) from the cache of the information saved for the transaction identified by the OperationID (including the OTP, expiration and summary)

5.21 Calculation (back-end side) of the "challengeString" through the information retrieved in the previous steps, using the same coding function used by the App on the smartphone S 5.22 Calculation (back-end side) of the Response, starting from the challengeString and the deviceFingerprint by applying the same function used by the App on the smartphone S and comparison of the Response just calculated with that sent by the smartphone S (note that in a possible implementation the verification of the response can be obtained in a similar way through verification of the timed OTPV).

5.23 Updating the status on the cache (status=CONFIRMED). Note that updating the status is the condition that allows the user you to exit the polling of step 5.10, and move to step 5.26

5.24. Result of dynamic logo verification process (OK/KO).

5.25. Display of the result.

5.26. Polling output (OK/KO/Continue-waiting), which is based on the status in the cache for the transaction in question (identified by the OperationID).

It should be emphasized that, in the preferred embodiment of the description, the method also encapsulates, in the animated image, the summary (i.e. the details) of the transaction, a string which then contributes to the payload, and which is then also used in the calculation of the response. Advantageously, when decoded, the payload conveyed by the animated image provides indications on the type of transaction and on the details thereof. Moreover, the function of calculating the so-called response depends not only on the OTP, but also on the identification code of the transaction and the details thereof. This is a substantial difference from the methods and systems of the known art mentioned above. In fact, the so-called response also depends on the device that is performing it. By contrast, traditional OTP codes are self-consistent as they depend only on a central security parameter and are not tied to external elements, except for application. The dynamic image and method proposed here, on the other hand, combine several elements, including peripheral ones, and bind the generation, display and reading transactions using multiple dimensions.

As a result of the present description, the "something you are" option can be used to unlock access by back-end server authentication. In fact, the description also combines "something you are" with "something you have" and "where you are" (context). Conversely, the system and method of the known art need to have a key for each device that needs to decode the OTP. The description in question is instead based on the concept of device fingerprint combined with hashing techniques (or one-way encodings). Advantageously, this allows the back-end to identify at all times the authenticity of the user/client device that has performed the transaction.

It should be noted that the OTP conveyed by the animated image is not encrypted, as in the prior art, and is therefore decodable by several devices, while the authentication test of the client device is provided by the calculation of the response, which is a function of a unique feature of the client device.

The invention claimed is:

1. A method for generating, displaying and reading an encoded animated image by an online service, the encoded animated image comprising a plurality of frames configured to be displayed sequentially on a graphical interface, an encoded payload comprising a One-Time Password code, a transaction identification code and a string with the details of the transaction itself, the encoded payload being distributed over at least two frames of the plurality of frames according to a reversible encoding function, the method comprising the following steps:

providing a random function for generating OTP codes, a reversible coding function, and a recognition function resident and executable on a web server associated with the online service;

providing a reading and decoding function and an identification function resident and executable on a client device associated with an authenticated user, the client device being equipped with a camera and communicating with the web server;

generating an OTP code through the random function, the OTP code being at least associated with an authenticated browsing session of the client device on the web server, the transaction identification code and the details of the transaction itself to form a payload;

generating the encoded animated image comprising a plurality of frames configured to be displayed in sequence on a graphical interface, encoding the payload by dividing it into at least two parts and distributing these on at least two frames of the plurality of frames by means of the reversible encoding function;

reproducing the plurality of frames in sequence on a graphical interface in communication with the web server, so as to display the encoded animated image;

reading and decoding the encoded payload using the reading and decoding function when the camera of the client device frames the encoded animated image displayed on the graphical interface;

generating an identification code by processing the decoded payload using the identification function and sending it to the web server;

classifying the client device as legitimate when the identification code processed through the recognition function corresponds to that expected for the corresponding OTP code.

2. The method according to claim 1, wherein the step of generating an identification code by processing the decoded payload via the identification function and sending it to the web server comprises the sub-step of:

sending the identification code to the web server using an encrypted protocol.

3. The method according to claim 1, wherein the step of generating an identification code by processing the decoded payload via the identification function and sending it to the web server comprises the sub-step of:

digitally signing the coded payload using the identification function to generate the identification code.

4. The method according to claim 1, wherein the step of generating an identification code by processing the decoded payload via the identification function and sending it to the web server comprises the sub-step of:

generating a second OTP code associated with the encoded payload using the identification function to generate the identification code.

5. The method according to claim 1, used to authorize a transaction on the online service requested by the authenticated user on an electronic device having a graphical interface, wherein the step of generating an OTP code through the random function includes the sub-step of associating the OTP code with the transaction requested by the authenticated user on the online service;

the step of reproducing the plurality of frames in sequence on a graphical interface in communication with the web server, so as to display the encoded animated image, comprises the sub-step of displaying the encoded animated image on the graphical interface of the electronic device;

comprising the further step of:

authorizing the transaction requested by the authenticated user on the online service when the client device is classified as legitimate.

6. The method according to claim 5, wherein:

the client device is a smartphone;

the transaction requested by the user requires the client device to be enabled to perform subsequent financial transactions;

the step of authorizing the transaction requested by the authenticated user on the online service when the client device is classified as legitimate includes the sub-step of enabling the client device to perform subsequent financial transactions.

7. The method according to claim 6, wherein:

the transaction requested by the user in a subsequent browsing session on the online service includes a financial transaction;

the step of authorizing the transaction requested by the authenticated user on the online service when the client device is classified as legitimate comprises the sub-step of authorizing the financial transaction only if the client device is enabled to execute financial transactions.

8. The method according to claim 5, wherein
the electronic device is a computer, tablet, smartphone or
  ATM.

\* \* \* \* \*